(12) United States Patent
Eda et al.

(10) Patent No.: US 10,246,660 B2
(45) Date of Patent: Apr. 2, 2019

(54) NATURAL-GAS PURIFICATION APPARATUS

(71) Applicant: MITSUBISHI HEAVY INDUSTRIES, LTD., Tokyo (JP)

(72) Inventors: Masayuki Eda, Houston, TX (US); Wataru Matsubara, Tokyo (JP); Shintaro Honjo, Tokyo (JP); Susumu Okino, Tokyo (JP); Hiromi Nakatani, Tokyo (JP); Masaki Yushima, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 182 days.

(21) Appl. No.: 15/475,944

(22) Filed: Mar. 31, 2017

(65) Prior Publication Data

US 2018/0283779 A1    Oct. 4, 2018

(51) Int. Cl.
*F25J 3/06* (2006.01)
*C10L 3/10* (2006.01)
*B01D 53/22* (2006.01)

(52) U.S. Cl.
CPC .............. *C10L 3/104* (2013.01); *B01D 53/22* (2013.01); *C10L 2290/548* (2013.01)

(58) Field of Classification Search
CPC .... F25J 3/0266; F25J 3/067; F25J 3/08; F25J 3/0615; F25J 2210/80; F25J 2215/80; B01D 53/1475; B01D 53/1462; B01D 2256/22; B01D 2257/504
See application file for complete search history.

(56) References Cited

U.S. PATENT DOCUMENTS

| 3,250,080 A | * | 5/1966 | Garwin | B01D 53/226 62/624 |
| 2011/0247360 A1 | * | 10/2011 | Hasse | B01D 53/228 62/606 |
| 2013/0098105 A1 | * | 4/2013 | Northrop | C10L 3/102 62/617 |
| 2015/0300734 A1 | * | 10/2015 | Davidian | B01D 53/002 62/624 |

FOREIGN PATENT DOCUMENTS

JP  2009-113994 A  5/2009
JP  2016-155987 A  9/2016

* cited by examiner

*Primary Examiner* — Brian M King
(74) *Attorney, Agent, or Firm* — Westerman, Hattori, Daniels & Adrian, LLP (57) ABSTRACT

A natural-gas purification apparatus includes: a compressor that adjusts the pressure of natural gas from the ground; a cooling unit that liquefies and separates a part of natural-gas liquid by cooling the natural gas after the pressure adjustment by the compressor; a heating unit that heats the natural gas after the separation of the part; a carbon-dioxide separation unit that separates carbon dioxide from the natural gas heated by the heating unit; and an arithmetic control device that adjusts and controls at least one of the compressor, the cooling unit, and the heating unit to a value which has been set in advance according to the composition of the natural gas, such that the cooling unit will liquefy and separate the part of the natural-gas liquid in the natural gas and the carbon-dioxide separator maintains the remaining part of the natural-gas liquid in the natural gas in gaseous form.

9 Claims, 5 Drawing Sheets

NATURAL-GAS PURIFICATION APPARATUS

TECHNICAL FIELD

The present invention relates to a natural-gas purification apparatus for purifying natural gas from the ground by separating carbon dioxide from the natural gas.

BACKGROUND ART

Natural gases discharged to the surface of the ground from high-temperature high-pressure underground areas such as oil and gas fields include: dry gases with one to two carbon atoms such as methane ($CH_4$) and ethane ($C_2H_6$), which are in gaseous form even at normal temperature and pressure; natural-gas liquids containing components with three to four carbon atoms such as propane ($C_3H_3$) and butane ($C_4H_{10}$) which are in gaseous form at normal temperature and pressure but are easily liquefied when pressurized or cooled, and components with five or more carbon atoms such as pentane ($C_5H_{12}$), which is in liquid form at normal temperature and pressure; and non-hydrocarbon gases such as carbon dioxide ($CO_2$).

Such a natural gas is pressurized (to 0.5 to 0.2 MPa) by a compressor and cooled (to 0 to 20° C.) by a cooling unit to undergo gas-liquid separation in which a part of its natural-gas liquid is liquefied. The natural gas is then raised in temperature by being heated (to 50 to 80° C.) by a heating unit. Thereafter, the carbon dioxide is passed through a carbon-dioxide separation membrane to a lower pressure side, so that the carbon dioxide is separated and removed. As a result, the natural gas is purified.

CITATION LIST

Patent Literatures (Patent Literature 1) Japanese Patent Application Publication No. 2016-155987
(Patent Literature 2) Japanese Patent Application Publication No. 2009-113994

SUMMARY OF INVENTION

Technical Problem

In the case where the carbon dioxide is separated and removed as mentioned above, the carbon dioxide expands and therefore drops in temperature when passed through the carbon-dioxide separation membrane to the lower pressure side. Consequently, the carbon dioxide cools the carbon-dioxide separation membrane. As the carbon dioxide thus cools the carbon-dioxide separation membrane and lowers its temperature, a part of the remaining natural-gas liquid is liquefied on the higher pressure side and covers the carbon-dioxide separation membrane. This might cause functional deterioration of the carbon-dioxide separation membrane.

Thus, in a conventional practice, the natural gas is cooled by the cooling unit to as low a temperature as possible (approximately 0° C.) to undergo gas-liquid separation in which a part of its natural-gas liquid is liquefied as much as possible, and then heated by the heating unit to as high a temperature as possible (approximately 80° C.) to maximize the difference from the dew point (liquefaction temperature). In this way, the generation of a liquid film on the higher pressure side is suppressed, and therefore the functional deterioration of the carbon-dioxide separation membrane is prevented.

Then, energy is wastefully consumed in cases where a liquid film is unlikely to be generated in the first place (such as cases where the amounts of the carbon dioxide component and the natural-gas liquid component in the natural gas are small).

In view of the above, an object of the present invention is to provide a natural-gas purification apparatus capable of greatly reducing wasteful energy consumption.

Solution to Problem

To achieve the above-described object, a natural-gas purification apparatus according to the present invention provides a natural-gas purification apparatus for purifying natural gas from ground by separating carbon dioxide from the natural gas, including: a pressure adjuster that adjusts a pressure or the natural gas from the ground; a natural-gas-liquid separator that liquefies and separates a part of natural-gas liquid by cooling the natural gas after the pressure adjustment by the pressure adjuster; a heater that heats the natural gas after the separation of the part of the natural-gas liquid by the natural-gas-liquid separator; a carbon-dioxide separator that separates carbon dioxide from the natural gas heated by the heater through a carbon-dioxide separation membrane; and a controller that adjusts and controls at least one of a pressure of the natural gas to be achieved by the pressure adjuster, a temperature to which the natural gas is to be cooled by that natural-gas-liquid separator, and a temperature to which the natural gas is to be heated by the heater to a value which has been set in advance according to composition of the natural gas from the ground, such that the natural-gas-liquid separator liquefies and separates the part of the natural-gas liquid in the natural gas and the carbon-dioxide separator maintains a remaining part of the natural-gas liquid in the natural gas in gaseous form.

Moreover, in the natural-gas purification apparatus according to the above-described present invention, the natural-gas purification apparatus preferably further includes: a gas-flow-rate detector that detects a flow rate of the natural gas before the pressure adjustment by the pressure adjuster; a gas pressure detector that detects the pressure of the natural gas before the pressure adjustment by the pressure adjuster; and a gas-temperature detector that detects a temperature of the natural gas before the pressure adjustment by the pressure adjuster, in which the controller adjusts and controls at least one of the pressure of the natural gas to be achieved by the pressure adjuster, the temperature to which the natural gas is to be cooled by the natural-gas-liquid separator, and the temperature to which the natural gas is to be heated by the heater to the value which has been set in advance according to the composition of the natural gas from the ground, based on information from the gas-flow-rate detector, the gas-pressure detector, and the gas-temperature detector such that the natural-gas-liquid separator liquefies and separates the part of the natural-gas liquid in the natural gas and the carbon-dioxide separator maintains the remaining part of the natural-gas liquid in the natural gas in gaseous form.

Moreover, in the natural-gas purification apparatus according to the above-described present invention natural-gas purification apparatus preferably further includes: a membrane-temperature detector that detects a temperature of the carbon-dioxide separation membrane of the carbon-dioxide separator; and a gas-dew-point detector that detects a dew point of the natural gas after the carbon-dioxide separation by the carbon-dioxide separator, in which the controller adjusts and controls at least one of the pressure of the natural gas to be achieved by the pressure adjuster, the temperature to which the natural gas is to be cooled by the natural-gas-liquid separator, and the temperature to which the natural gas is to be heated by the heater to the value which has been set in advance according to the composition of the natural gas from the ground, based on information from the membrane-temperature detector and the gas-dew-point detector such that the natural-gas-liquid separator liquefies and separates the part of the natural-gas liquid in the natural gas and the carbon-dioxide separator maintains the remaining part of the natural-gas liquid in the natural gas in gaseous form.

Moreover, in the natural-gas purification apparatus according to the above-described present invention, the membrane-temperature detector preferably includes an upper-limit-membrane-temperature detector that detects a temperature of the carbon-dioxide separation membrane of the carbon-dioxide separator at an upstream portion in a direction of natural-gas flow, and a lower-limit-membrane-temperature detector that detects a temperature of the carbon-dioxide separation membrane of the carbon-dioxide separator at a downstream portion in the direction of the natural-gas flow, and the controller preferably calculates a lower-limit gas temperature Tb and an upper-limit gas temperature Tt based on the dew point Td detected by the gas-dew-point detector, and controls actuation of the heater based on information from the upper limit-membrane-temperature detector and the lower-limit-membrane-temperature detector such that an upstream membrane temperature T1 detected by the upper-limit-membrane-temperature detector is lower than or equal to the upper-limit gas temperature Tt (T1≤Tt) and a downstream membrane temperature T2 detected by the lower-limit-membrane-temperature detector is higher than or equal to the lower-limit gas temperature Tb (T2≥Tb).

Moreover, in the natural-gas purification apparatus according to the above-described present invention, if the calculated upper-limit gas temperature Tt is higher than or equal to a withstand temperature γ of the carbon-dioxide separation membrane of the carbon-dioxide separator (Tt≥γ), the controller preferably controls actuation of the natural-gas-liquid separator based on information from the gas-dew-point detector such that the upper-limit gas temperature Tt falls below the withstand temperature γ (Tt<γ).

Moreover, in the natural-gas purification apparatus according to the above-described present invention, if the natural-gas-liquid separator reaches a maximum cooling temperature but the upper-limit gas temperature Tt is still higher than or equal to the withstand temperature γ (Tt≥γ), the controller preferably controls actuation of the pressure ad luster based on the information from the gas-dew-point detector such that the upper-limit gas temperature Tt falls below the withstand temperature γ (Tt<γ).

Moreover, in the natural-gas purification apparatus according to the above-described present invention, the lower-limit-membrane-temperature detector preferably detects a temperature of a surface on a natural-gas flow side of the carbon-dioxide separation membrane of the carbon-dioxide separator at a downstream portion in the direction of the gas flow, and the controller preferably figures out the downstream membrane temperature T2 based on natural-gas-flow downstream membrane temperature T2a detected by the lower-limit-membrane-temperature detector.

Moreover, in the natural-gas purification apparatus according to the above-described present invention, the lower-limit-membrane-temperature detector preferably detects a temperature of a surface on a carbon-dioxide flow side of the carbon-dioxide separation membrane of the carbon-dioxide separator at a downstream portion in the direction of the gas flow, and the controller preferably figures out the downstream membrane temperature T2 based on carbon-dioxide-flow downstream membrane temperature T2b detected the lower-limit-membrane-temperature detector.

Moreover, in the natural-gas purification apparatus according to the above-described present invention, the lower-limit-membrane-temperature detector preferably includes downstream-natural-gas-temperature detector that detects a temperature of the gas on a natural-gas flow side of the carbon-dioxide separation membrane of the carbon-dioxide separator at a downstream portion in the direction of the gas flow, and a downstream-carbon-dioxide-temperature detector that detects a temperature of the carbon dioxide on a carbon-dioxide flow side of the carbon-dioxide separation membrane of the carbon dioxide separator at the downstream portion in the direction of the gas flow, and the controller preferably figures out the downstream membrane temperature T2 based on a downstream natural-gas temperature T2c detected by the downstream-natural-gas-temperature detector and a downstream carbon-dioxide temperature T2d detected the downstream-carbon-dioxide-temperature detector.

Advantageous Effect of Invention

In the natural-gas purification apparatus according to the present invention, the controller adjusts and controls at least one of the pressure of the natural gas to be achieved by the pressure adjuster, the temperature to which the natural gas is to be cooled by the natural-gas-liquid separator, and the temperature to which the natural gas is to be heated by the heater to a value which has been set in advance according to the composition of the natural gas from the ground, such that the natural-gas-liquid separator will liquefy and separate a part of natural-gas liquid in the natural gas and the carbon-dioxide separator will maintain the remaining part of the natural-gas liquid in the natural gas in gaseous form. Hence, the natural gas does not need to always be cooled by the natural-gas-liquid separator to as low a temperature as possible to undergo gas-liquid separation in which a part of the natural-gas liquid is liquefied as much as possible, and then heated by the heater to as high a temperature as possible to maximize the difference from the dew point (liquefaction temperature), as in the conventional practice. Hence, it is possible to prevent wasteful energy consumption while always preventing the generation of a liquid film over the carbon-dioxide separation membrane of the carbon-dioxide separator.

DESCRIPTION OF EMBODIMENTS

Embodiments of a natural-gas purification apparatus according to the present invention will be described with reference to the drawings. It is to be noted that the present invention is not limited only to the following embodiments to be described with reference to the drawings.

First Embodiment

A first embodiment of the natural-gas purification apparatus according to the present invention will be described with reference to FIGS. 1 and 2.

Figure 1:
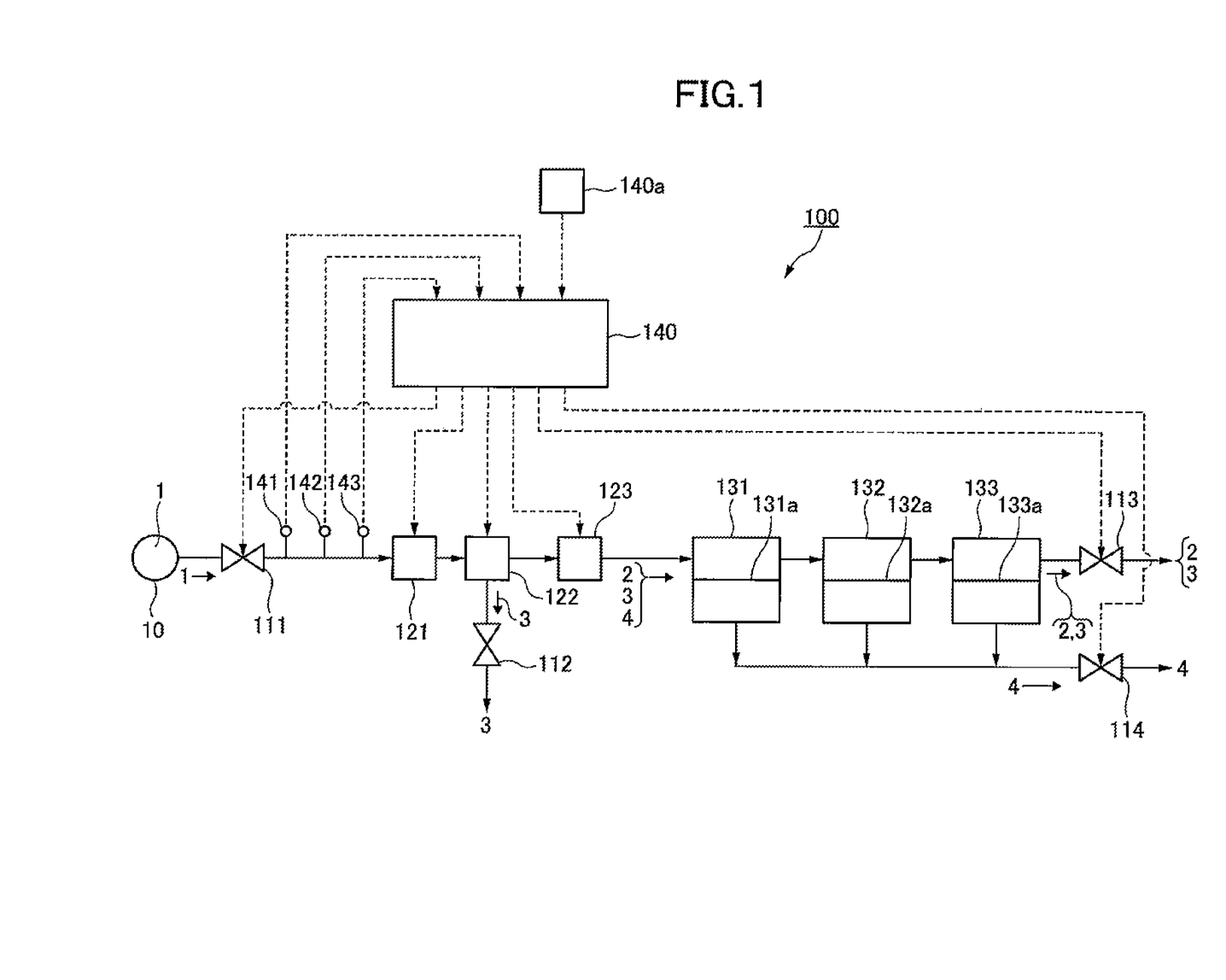
FIG. 1 illustrates a schematic configuration diagram of a first embodiment of a natural-gas purification apparatus according to the present invention.

As illustrated in FIG. 1, a natural-gas source 10 that discharges natural gas 1 from the ground is connected to an inlet port of a compressor 121 through a valve 111. An outlet port of the compressor 121 is connected to an inlet port of a cooling unit outlet port of the cooling unit 122 communicates with the outside of the system through a valve 112. A gas outlet port of the cooling unit 122 is connected to an inlet port of a heating unit 123. An outlet port of the heating unit 123 is connected to a gas inlet port of a first carbon-dioxide separation unit 131 including a carbon-dioxide separation membrane 131a that separates carbon dioxide ($CO_2$) from gas.

A post-separation-gas outlet port of the first carbon-dioxide separation unit 131 is connected to a gas inlet port of a second cardon-dioxide separation unit 132 including a carbon-dioxide separation membrane 132a. A post-separation-gas outlet port of the second carbon-dioxide separation unit 132 is connected to a gas inlet port of a third carbon-dioxide separation unit 133 including a carbon-dioxide separation membrane 133a. A post-separation-gas outlet port of the third carbon-dioxide separation unit 133 is connected to the outside of the system through a valve 113. Carbon-dioxide outlet ports of the first to third carbon-dioxide separation units 131 to 133 are connected to the outside or the system through a valve 114.

Between the valve 111 and the compressor 121 are arranged a gas-flow-rate sensor 141, a gas-temperature sensor 142, and a gas-pressure sensor 143 which are a gas-flow-rate detector, a gas-temperature detector, and a gas-pressure detector, respectively. The sensors 141 to 143 are electrically connected to an input of an arithmetic control device 140 which is a controller. An input unit 140a which is an input device that inputs information such as the composition and the supply flow rate of the natural gas 1, is electrically connected to the input of the arithmetic control device 140.

An output of the arithmetic control device 140 is electrically connected to the valves 111, 113, and 114 and electrically connected to the compressor 121, the cooling unit 122, and the heating unit 123. The arithmetic control device 140 can control the opening degrees of the valves 111, 113, and 114 and control the actuation of the compressor 121, the cooling unit 122, and the heating unit 123 based on the above-mentioned information inputted from the input unit 140a and information from the sensors 141 to 143 (details will be described later).

Note that, in this embodiment, components such as the valve 111 constitute a gas-flow-rate adjuster, components such as the valves 113 and 114 and the compressor 121 constitute a pressure adjuster, components such as the cooling unit 122 constitute a natural-gas-liquid separator, components such as the heating unit 123 constitute a heater, and components such as the first to third carbon-dioxide separation units 131 to 133 constitute a carbon-dioxide separator.

Next, a natural-gas purification method using a natural-gas purification apparatus 100 according to this embodiment as mentioned above will be described.

Figure 2:
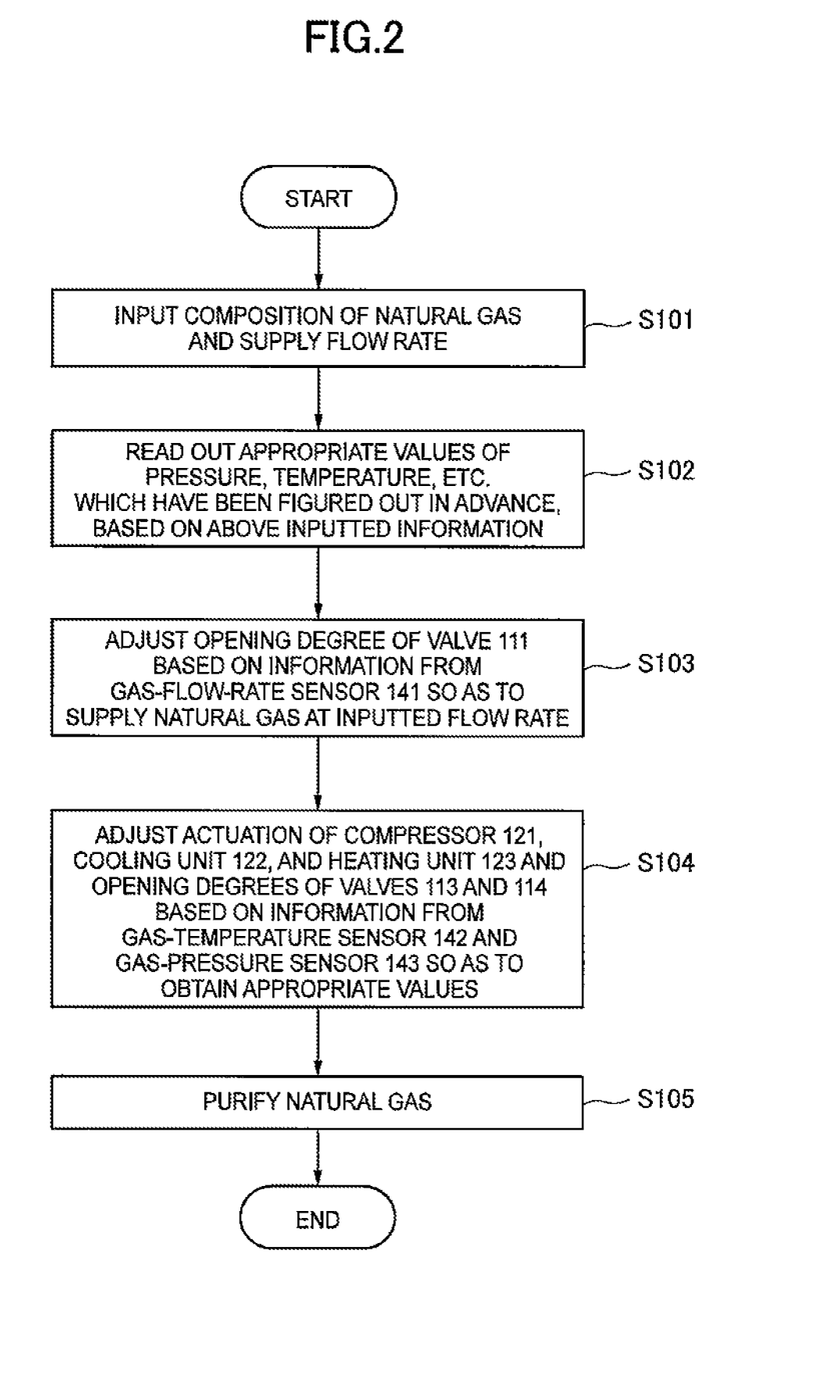
FIG. 2 illustrates a flowchart of main control performed in the natural-gas purification apparatus in FIG. 1.

First, the composition of the natural gas 1 from the natural-gas source 10 (the proportions of dry gas 2, natural-gas liquid 3, carbon dioxide 4, and the like) is figured out in advance using analysis equipment such as a gas chromatograph (GC), and this composition of the natural gas 1 and a supply flow rate are inputted into the input unit 140a (S101 in FIG. 2). Then, based on the above information from the input unit 140a, the arithmetic control device 140 reads out an appropriate value of pressure for purifying the natural gas 1 from the ground, an appropriate value of temperature for liquefying a part of the natural-gas liquid 3, and an appropriate value of temperature for maintaining the remaining part of the natural-gas liquid 3 in gaseous form (preventing liquefaction) for the composition of the natural gas 1 (S102 in FIG. 2). These appropriate values have been figured out, inputted, and set in advance.

Thereafter, based on the information from the gas-flow-rate sensor 141, the arithmetic control device 140 adjusts and controls the opening degree of the valve 111 so as to supply the natural gas 1 at the inputted flow rate (S103 in FIG. 2.). Also, based on the information from the gas-temperature sensor 142 and the gas-pressure sensor 143, the arithmetic control device 140 adjusts and controls the actuation of the compressor 121, the cooling unit 122, and the heating unit 123 and the opening degrees of the valves 113 and 114 so as to obtain the appropriate values (S104 in FIG. 2).

Thus, the natural gas 1 is pressurized (to 0.5 to 2 MPa) by the compressor 121 and then cooled (to 0 to 20° C.) by the cooling unit 122, so that a part of the natural-gas liquid 3 is liquefied and discharged to the outside of the system through the valve 112. On the other hand, the remaining gas (the dry gas 2, the remaining part of natural-gas liquid 3, and the carbon dioxide 4) is heated (to 50 to 80° C.) by the heating unit 123 and then supplied to the carbon-dioxide separation units 131 to 133.

When the natural gas 1 is supplied to the carbon-dioxide separation units 131 to 133, to the carbon dioxide 4 is moved through the carbon-dioxide separation membranes 113a to 133a to the lower pressure side (the carbon-dioxide flow side) and is discharged to the outside of the system through the valve 114. On the other hand, the remaining gas (the dry gas 2 and the remaining part of the natural-gas liquid 3) is discharge in gaseous form to the outside of the system through the valve 113 without being liquefied.

Here, for example, in response to a rise in temperature of the natural gas 1 from the natural-gas source 10 due to some reason, the arithmetic control device 140 controls the actuation of the cooling unit 122 based on the information from the gas-temperature sensor 142 so as to obtain the appropriate value of temperature for liquefying a part of the natural-gas liquid 3. In response to a drop in temperature, the arithmetic control device 140 controls the actuation of the heating unit 123 based on the information from the gas-temperature sensor 142 so as to obtain the appropriate value of temperature for maintaining the remaining part of the natural-gas liquid 3 in gaseous form (preventing liquefaction).

Also, for example, in response to a change such as a rise or drop in pressure of the natural gas 1 from the natural-gas source 10 due to some reason, the arithmetic control device 140 adjusts and controls the opening degrees of the valves 113 and 114 and the actuation of the compressor 121 based on the information from the gas-pressure sensor 143 so as to obtain the appropriate value of pressure for purifying the natural gas 1.

In this way, a part of the natural-gas liquid 3 is reliably separated, thereby lower the dew point (liquefaction temperature), and the carbon dioxide 4 is reliably removed, so that the natural gas 1 is purified (S105 in FIG. 2).

In sum, in this embodiment, generation of a liquid film over the carbon-dioxide separation membranes 131a to 133a of the carbon-dioxide separation units 131 to 133 is prevented by adjusting and controlling the actuation of the compressor 121, the cooling unit 122, and the heating unit 123 and the opening degrees of the valves 111, 113, and 114 based on the information from the sensors 141 to 143 so as to obtain the above-mentioned values which have been set in advance according to the composition of the natural gas 1 from the ground.

Hence, according to this embodiment, the natural gas 1 does not need to always be cooled by the cooling unit 122 to as low a temperature as possible (approximately 0° C.) to undergo gas-liquid separation in which the natural-gas liquid 3 is liquefied as much as possible, and then heated by the heating unit 123 to as high a temperature as possible (approximately 80° C.) to maximize the difference from the dew point (liquefaction temperature), as in the conventional practice. Thus, it is possible to prevent wasteful energy consumption while always preventing the generation of a liquid film over the carbon-dioxide separation membranes 131a to 133a of the first to third carbon-dioxide separation units 131 to 133.

Second Embodiment

A second embodiment of the natural-gas purification apparatus according to the present invention will be described with reference to FIGS. 3, 4A, and 4B. However, for the same components as those in the above embodiment, description overlapping the description in the above embodiment will be omitted by using the same reference signs as those used in the above embodiment.

Figure 3:
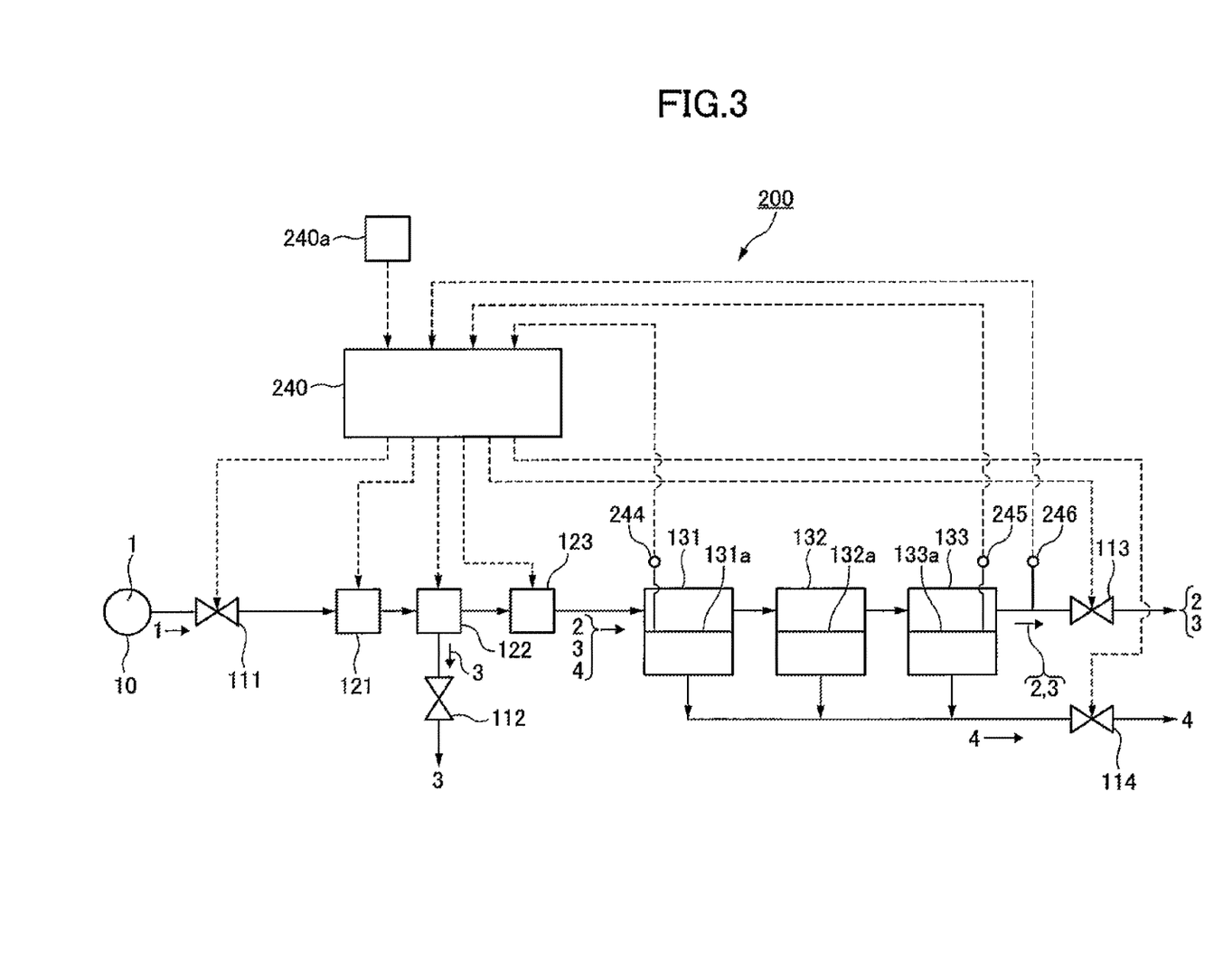
FIG. 3 illustrates a schematic configuration diagram of a second embodiment of the natural-gas purification apparatus according to the present invention.

As illustrated in FIG. 3, at the surface on the higher pressure side (natural-gas flow side) of the carbon-dioxide separation membrane unit 131a of the first carbon-dioxide separation unit 131 at an upstream portion in the direction of the gas flow, an upper-limit-temperature sensor 244 is mounted which is an upper-limit-membrane-temperature detector that detects the temperature of the surface on the higher pressure side (natural-gas flow side) of the carbon-dioxide separation membrane 131a at the upstream portion in the direction of the gas flow.

At the surface on the higher pressure side (natural-gas flow side) of the carbon-dioxide separation membrane 133a of the third carbon-dioxide separation unit 133 at a downstream portion in the direction of the gas flow, a lower-limit-temperature sensor 245 is mounted which is a lower-limit-membrane-temperature detector that detects the temperature of the surface on the higher pressure side (natural-gas flow side) of the carbon-dioxide separation membrane 133a at the downstream portion in the direction of the gas flow.

A dew-point meter 246 which is a gas-dew-point detector is provided between the third carbon-dioxide separation unit 133 and the valve 113.

The temperature sensors 244 and 245 and the dew-point meter 246 are electrically connected to an input of an arithmetic control device 240 which is a controller. An input unit 240a which is an input device that inputs information such as the composition and the supply flow rate of the natural gas 1, is electrically connected to the input of the arithmetic control device 240.

An output of the arithmetic control device 240 is electrically connected to the valves 111, 113 and 114 and electrically connected to the compressor 121, the cooling unit 122, and the heating unit 123. The arithmetic control device 240 can control the opening degrees of the valves 111, 113, and 114 and control the actuation of the compressor 121, the cooling unit 122, and the heating unit 123 based on the above-mentioned information inputted from the input unit 240a and information from the temperature sensors 244 and 245 and the dew-point meter 246 (details will be described later).

Note that in this embodiment, components such as the upper-limit-temperature sensor 244 and the lower-limit-temperature sensor 245 constitute a membrane-temperature detector.

Next, a natural-gas purification method using a natural-gas purification apparatus 200 according to this embodiment as mention above will be described.

Figure 4A:
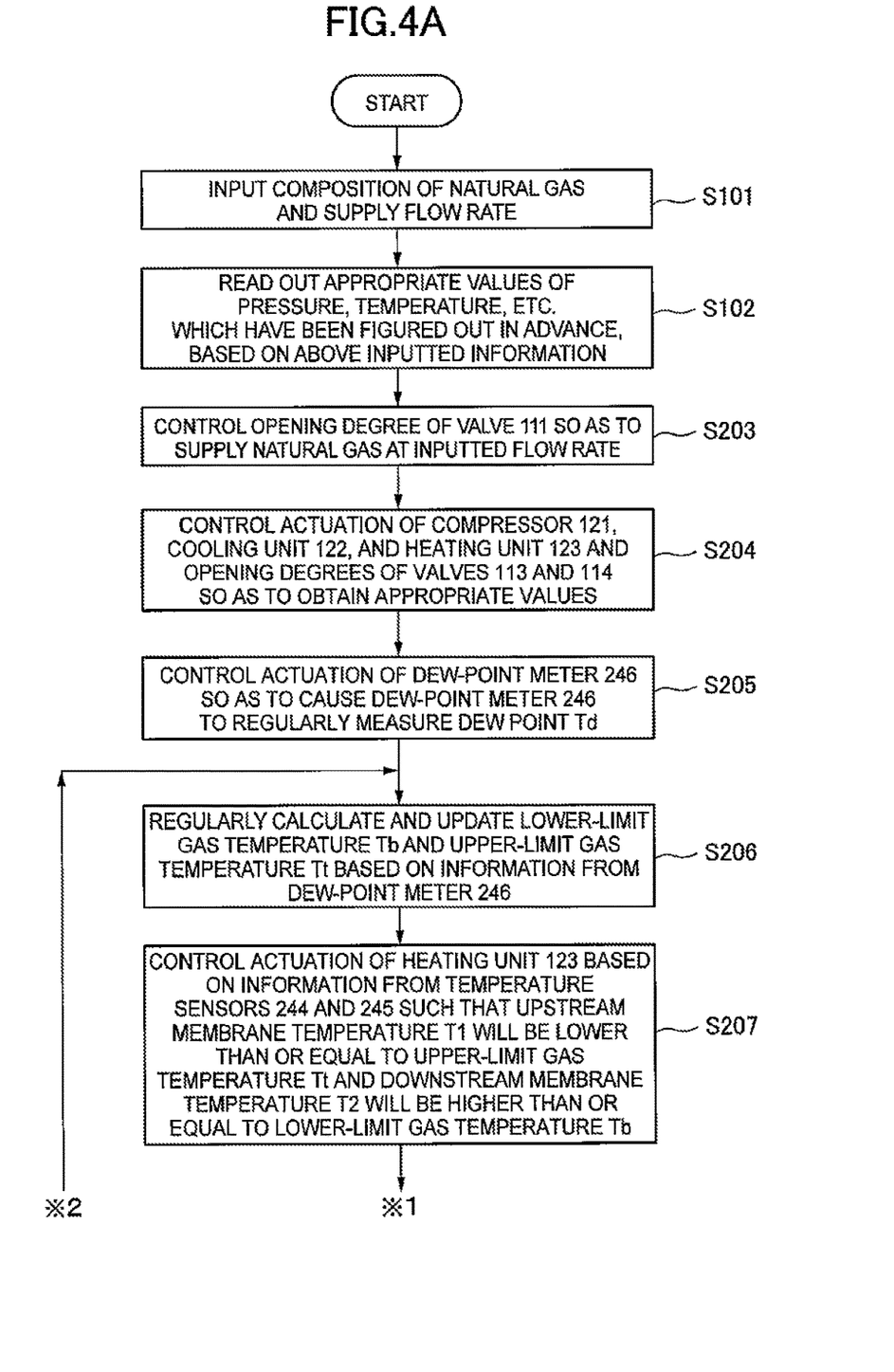
FIG. 4A illustrates a flowchart of main control preformed in the natural-gas purification apparatus in FIG. 3.
Figure 4B:
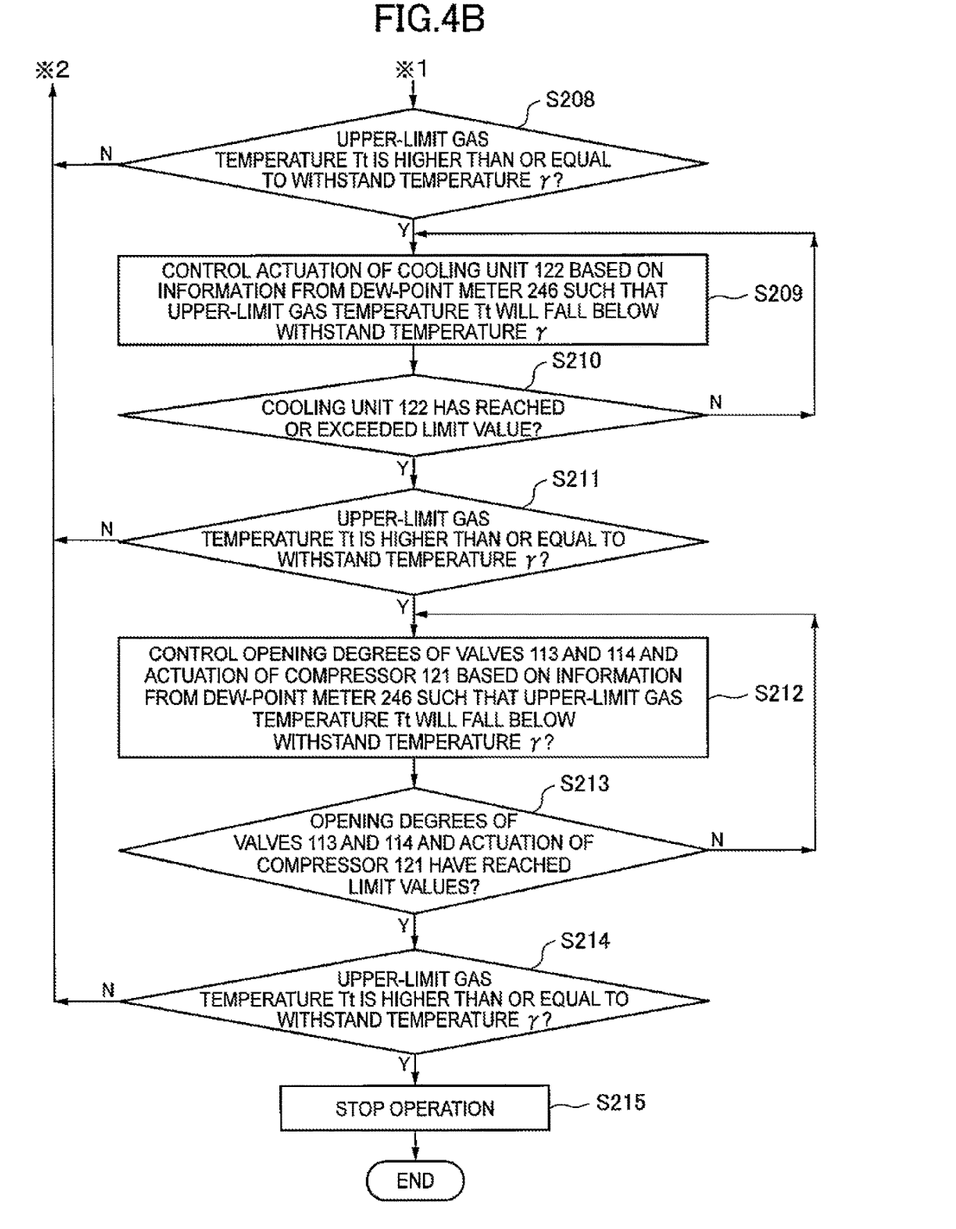
FIG. 4B illustrates a flowchart of the main control continuing from FIG. 4A.

First, as in the previous embodiment, the composition of the natural gas 1 from the natural-gas source 10 (the proportions of the dry gas 2, the natural-gas liquid 3, the carbon dioxide 4, and the like) is figured out in advance using analysis equipment such as a gas chromatograph (GC), and this composition of the natural gas 1 and a supply flow rate are inputted into the input unit 240a (S101 in FIG. 4A). Then, based on the above information from the input unit 240a, the arithmetic control device 240 reads out an appropriate value of pressure for purifying the natural gas 1 from the ground, an appropriate value of temperature for liquefying a part of the natural-gas liquid 3, and an appropriate value of temperature for maintaining the remaining part of the natural-gas liquid 3 in gaseous form (preventing liquefaction) for the composition of the natural gas 1 (S102 in FIG. 4A). These appropriate values have been figured out, inputted, and set in advance.

Thereafter, the arithmetic control device 240 adjusts and controls the opening degree of the valve 111 so as to supply the natural gas 1 at the inputted flow rate (S203 in FIG. 4A). Also, the arithmetic control device 240 adjusts and controls the actuation of the compressor 121, the cooling unit 122, and the heating unit 123 and the opening degrees of the valves 113 and 114 so as to obtain the appropriate values (S204 in FIG. 4).

Thus, as in the previous embodiment, the natural gas 1 is pressurize (to 0.5 to 2 MPa) by the compressor 121 and then cooled (to 0 to 20° C.) by the cooling unit 122, so that a part of the natural-gas liquid 3 is liquefied and discharged to the outside of the system through the valve 112. On the other hand, the remaining gas (the dry gas 2, the remaining part of the natural-gas liquid 3, and the carbon dioxide 4) is heated (to 50 to 80° C.) by the heating unit 123 and then supplied to the carbon-dioxide separation units 131 to 133.

As in the previous embodiment, when the natural gas 1 is supplied to the carbon-dioxide separation units 131 to 133, the carbon dioxide 4 is moved through the carbon-dioxide separation membranes 131a to 133a to the lower pressure side (carbon-dioxide flow side) and is discharged to the outside of the system through the valve 114. On the other hand, the remaining gas (the dry gas 2 and the remaining part of the natural-gas liquid 3) is discharged in gaseous form to the outside of the system through the valve 113 without being liquefied.

In this operation, the arithmetic control device 240 controls the actuation of the dew-point meter 245 so as to cause the dew-point meter 245 to regularly measure a dew point Td of the purified gas (the dry gas 2 and the remaining part of the natural-gas liquid 3) discharged from the third carbon-dioxide separation unit 133 (S205 in FIG. 4A). Based on this information (dew point Td) from the dew-point meter 246, the arithmetic control device 240 regularly calculates and updates a lower-limit gas temperature Tb and an upper-limit gas temperature Tt (S206 in FIG. 4A).

Here, the lower-limit gas temperature Tb is a value obtained by adding a temperature $\alpha$ that will not cause a risk of liquefaction (e.g. 5° C.) to the dew point Td (Td+$\alpha$), and the upper-limit gas temperature Tt is a value obtained by adding a temperature $\beta$ that will not cause excessive energy consumption (e.g. 20° C.) to the dew point Td (Td+$\beta$). However, the upper-limit gas temperature Tt is a temperature lower than a withstand temperature $\gamma$ (e.g. 80 C) of the carbon-dioxide separation membranes 131a to 133a of the carbon-dioxide separation units 131 to 133 (Tt<$\gamma$).

Then, the arithmetic control device 240 calculates a downstream membrane temperature T2 based on a natural-gas-flow downstream membrane temperature T2a detected by the lower-limit-temperature sensor 245. In other words, the arithmetic control device 240 determines this natural-gas-flow downstream membrane temperature T2a as the downstream membrane temperature T2 (T2a=T2). Further, the arithmetic control device 240 controls the actuation of the heating unit 123 based on the information from the temperature sensor 244 and 245 such that an upstream membrane temperature T1 detected by the upper-limit-temperature sensor 244 will be lower than or equal to the upper-limit gas temperature Tt (T1≤Tt) and the downstream membrane temperature T2 (=T2a) will be higher than or equal to the lower-limit gas temperature Tb (T2≥Tb) (S207 in FIG. 4A).

Consequently, in the previous embodiment, a part of the natural-gas liquid 3 is separated and the carbon dioxide 4 is removed, so that the natural gas 1 purified.

There is a case where due to some reason, for example, the dew point Td rises and the upper-limit gas temperature Tt reaches or exceeds the withstand temperature $\gamma$ (Tt≥$\gamma$) (S208 in FIG. 5B) during operation with the actuation of the heating unit 123 controlled as above based on the information from the sensors 244 and 245 such that the upstream membrane temperature T1 will be lower than or equal to the upper-limit gas temperature Tt (T1≤Tt) and the downstream membrane temperature T2 will be higher than or equal to the lower-limit gas temperature Tb (T2≥Tb). In this case, the arithmetic control device 240 controls the actuation of the cooling unit 122 based on the information from the dew-point meter 246 such that the upper-limit gas temperature Tt will fall below the withstand temperature $\gamma$ (Tt<$\gamma$), that is, the dew point Td will fall to a temperature lower than a temperature obtained by subtracting the temperature $\beta$ from the withstand temperature $\gamma$ (Td<$\gamma$−$\beta$) (S209 in FIG. 4B). In sum, the cooling temperature of the cooling unit 122 is lowered to lower the dew point Td of the gas to be supplied to the carbon-dioxide separation units 131 to 133.

In this way, the natural gas 1 is purified similarly to the above.

There is a case where the cooling temperature of the cooling unit 122 is lowered as above to such an extent that the cooling unit 122 reaches its limit value (S210 in FIG. 4B), but the upper-limit (gas temperature Tt does still not fall below the withstand temperature $\gamma$ (Tt<$\gamma$) (S211 in FIG. 4B), that is, the dew point Td does still not fall to a temperature lower than the temperature obtained by subtracting the temperature $\beta$ from the withstand temperature $\gamma$(Td<$\gamma$−$\beta$). In this case, the arithmetic control device 240 adjusts and controls the opening degrees of the valves 113 and 114 and the actuation of the compressor 121 based on the information from the dew-point meter 246 such that the upper-limit gas temperature Tt will fall below the withstand temperature $\gamma$ (Tt<$\gamma$), that is, the dew point Td will fall to a temperature lower than the temperature obtained by subtracting the temperature $\beta$ from the withstand temperature $\gamma$ (Td<$\gamma$−$\beta$) (S212 in FIG. 4B). In sum, the pressure inside the system is lowered to lower the dew point Td of the gas to be supplied to the carbon-dioxide separation units 131 to 133.

In this way, the natural gas 1 is purified similarly to the above.

Further, there is a case where the pressure inside the system is lowered as above to such an extent that the opening degrees of the valves 113 and 114 and the actuation of the compressor 121 reach their limit values (S213 in FIG. 4B), but the upper-limit gas temperature Tt does still not fall below the withstand temperature $\gamma$(Tt<$\gamma$) (S214 in FIG. 4B), that is, the dew point Td does still not fall to a temperature lower than the temperature obtained by subtracting the temperature $\beta$ from the withstand temperature $\gamma$ (Td<$\gamma$−$\beta$). In this case, the arithmetic control device 240 determines based on the information from the dew-point meter 246 that the composition of the natural gas 1 from the natural-gas source 10 (the proportions of the dry gas 2, the natural-gas liquid 3, the carbon dioxide 4, and the like), the appropriate values which have been figured out, inputted, and set in advance, and so on are not correct, and stops the operation (S215 in FIG. 4B).

In sum, in the previous embodiment, the actuation of the compressor 121, the cooling unit 22, and the heating unit 123 and the opening degrees of the valves 111, 113, and 114 are adjusted and controlled base on the information from the sensors 141 to 143 so as to obtain the above-mentioned values which have been set in advance according to the composition of the natural gas 1 from the ground; in other words, feed-forward (FF) control is performed. In contrast, in this embodiment, the actuation of the compressor 121, the cooling unit 122, and the heating unit 123 and the opening degrees of the valves 111, 113, and 114 are adjusted and controlled based on the information from the temperature sensors 244 and 245 and the dew-point meter 246 so as to obtain the above-mentioned values which have been set in advance according to the composition of the natural gas 1 from the ground; in other words, feedback (FB) control is performed.

Thus, according to this embodiment, it is possible to prevent wasteful energy consumption while always preventing the generation of a liquid film over the carbon-dioxide separation membranes 131a to 133a of the first to third carbon-dioxide separation units 131 to 133, as in the previous embodiment.

Other Embodiments

Meanwhile, in the first embodiment, the actuation of the compressor 121, the cooling unit 122, and the heating unit 123 and the opening degrees of the valves 111, 113, and 114 are adjusted and controlled based on the information from the sensors 141 to 143 so as to obtain the above-mentioned values which have been set in advance according to the composition of the natural gas 1 from the ground; in other words, feed-forward (FF) control is performed. However, in another embodiment, for example, the upper-limit-temperature sensor 244 may be provided as in the second embodiment, and the controller may be designed to be capable of adjusting and controlling the actuation of the heating unit 123 based on the information from upper-limit-temperature sensor 244 such that the carbon-dioxide separation membranes 131a to 133a of the carbon-dioxide separation units 131 to 133 will not reach or exceed the withstand temperature γ. In this way, the deterioration of the carbon-dioxide separation membranes 131a to 133a can be prevented more reliably.

Also, in the second embodiment, the upstream membrane temperature T1 is detected by providing the upper-limit-temperature sensor 244 at the surface on the higher pressure side (natural-gas flow side) of the carbon-dioxide separation membrane 131a of the first carbon-dioxide separation unit 131 at an upstream portion in the direction of the gas flow. In another embodiment, for example, an upper-limit-membrane-temperature detector may be provided between the outlet port of the heating unit 123 and the gas inlet port of the first carbon-dioxide separation unit 131, and the upstream membrane temperature T1 may be figured out based on the temperature detected by the upper-limit-membrane-temperature detector.

Also, in the second embodiment, the natural-gas-flow downstream membrane temperature T2a is detected by providing the lower-limit-temperature sensor 245 at the surface on the higher pressure side (natural-gas flow side) of the carbon-dioxide separation membrane 133a of the third carbon-dioxide separation unit 133 at a downstream portion in the direction of the gas flow. In this way, the control device 240 can calculate the downstream membrane temperature T2 based on this natural-gas-flow downstream membrane temperature T2a, that is, determine the natural-gas-flow downstream membrane temperature T2a as the downstream membrane temperature T2 (T2a=T2). In another embodiment, for example, a lower-limit-membrane-temperature detector may be provided which detects the temperature of the surface on the lower pressure side (carbon-dioxide flow side) of the carbon-dioxide separation membrane 133a of the third carbon-dioxide separation unit 133 at a downstream portion in the direction of the gas flow. Further, the controller may figure out the downstream membrane temperature T2 based on a carbon-dioxide-flow downstream membrane temperature T2b detected by this lower-limit-membrane-temperature detector. Specifically, for example, an amount of decrease δ in the temperature of the membrane's surface on the higher pressure side relative to the temperature of the membrane's surface on the lower pressure side may be figured out in advance, the downstream membrane temperature T2 may be figured out from the carbon-dioxide-flow downstream membrane temperature T2b with the amount of decrease δ taken into account (=T2b−δ).

Further, for example, a downstream-natural-gas-temperature detector may be provided which detects the temperature of the natural gas on the higher pressure side (natural-gas flow side) of the carbon-dioxide separation membrane 133a of the third carbon-dioxide separation unit 133 at a downstream portion in the direction of the gas flow, and a downstream-carbon-dioxide-temperature detector may be provided which detects the temperature of the carbon dioxide on the lower pressure side (carbon-dioxide flow side) of the carbon-dioxide separation membrane 133a at the downstream portion in the direction of the gas flow. Then, the controller may figure out the downstream membrane temperature T2 based on a downstream natural-gas temperature T2c detected by downstream-natural-gas-temperature detector and a downstream carbon-dioxide temperature T2d detected by the downstream-carbon-dioxide-temperature detector (e.g. T2={(T2c+T2d)/ε)}, where ε is a value determined based on the membrane's heat transferability (usually about 2).

Meanwhile, only the downstream-carbon-dioxide-temperature detector may be provided, and the downstream membrane temperature T2 may be figured out on the assumption that the downstream membrane temperature T2 is substantially equal to the downstream carbon-dioxide temperature T2d (T2≅T2d).

Also, in the second embodiment, the dew-point meter 246 measures the dew point Td of the purified gas (the dry gas 2 and the remaining part of the natural-gas liquid 3) discharged from the third carbon-dioxide separation unit 133. However, in another embodiment, for example, an inlet gas-pressure sensor may be provided between the outlet port of the heating unit 123 and the gas inlet port of the first carbon-dioxide separation unit 131, and an outlet gas-pressure sensor may be provided between the gas outlet port of the third carbon-dioxide separation unit 133 and the valve 113. Further, the controller may calculate the composition of the purified gas (the dry gas 2 and the remaining part of the natural-gas liquid 3) discharged from the third carbon-dioxide separation unit 133 based on the composition of the natural gas 1 which have been figured out in advance, characteristics of the carbon-dioxide separation membranes 131a to 133a of the carbon-dioxide separation units 131 to 133 (carbon-dioxide selectivity and permeation rate), the parameters of the compressor 121, the cooling unit 122, and the heating unit 123, and the information (pressure value) from the inlet gas-pressure sensor, and figure out the dew point Td of the purified gas with the information (pressure value) from the outlet gas-pressure sensor taken into account.

Also, in the first embodiment, the arithmetic control device 140 prevents the generation of a liquid film over the carbon-dioxide separation membranes 131a to 133a of the carbon-dioxide separation units 131 to 133 by adjusting and controlling the opening degree of the valve 111 based on the information from the gas-flow-rate sensor 141 so as to supply the natural gas 1 at the inputted flow rate, and adjusting and controlling the actuation of the compressor 121, the cooling unit 122, and the heating unit 123 and the opening degrees of the valves 113 and 114 based on the information from the gas-temperature sensor 142 and the gas-pressure sensor 143 so as to obtain the appropriate values. However, the present invention is not limited to this case. An advantageous effect similar to the first embodiment can be achieved as long as the controller adjusts and controls at least one of the pressure of the natural gas to be achieved by the pressure adjuster, the temperature to which the natural gas is to be cooled by the natural-gas-liquid separator, and the temperature to which the natural gas is to be heated by the heater to a value which has been set in advance according to the composition of the natural gas from the ground, based on the information from the gas-flow-rate detector, the gas-pressure detector, and the gas-temperature detector such that the natural-gas-liquid separator will liquefy and separate a part of the natural-gas liquid in the natural gas and the carbon-dioxide separator will maintain the remaining part of the natural-gas liquid in the natural gas in gaseous form.

Also, in the second embodiment, the arithmetic control device 240 calculates the lower-limit gas temperature Tb and the upper-limit gas temperature Tt based on the dew point Td, which is detected by the dew-point meter 246. The arithmetic control device 240 control the actuation the heating, unit 123 based on the information from the temperature sensors 244 and 245 such that the upstream membrane temperature T1, which is detected by the upper-limit-temperature sensor 244, will be lower than or equal to the upper-limit gas temperature Tt (T1≤Tt) and the downstream membrane temperature T2, which is detected by the lower-limit-temperature sensor 245, will be higher than or equal to the lower-limit gas temperature Tb (T2≥Tb). If the calculated upper-limit gas temperature Tt reaches or exceeds the withstand temperature γ of the carbon-dioxide separation membranes 131a to 133a of the carbon-dioxide separation units 131 to 133 (Tt≥γ), the arithmetic control device 240 controls the actuation of the cooling unit 122 based on the information from the dew-point meter 246 such that the upper-limit gas temperature Tt will fall below the withstand temperature γ (Tt≤γ). Then, if the cooling unit 122 reaches its limit value but the upper-limit gas temperature Tt is still higher than or equal to the withstand temperature γ (Tt≥γ), the arithmetic control device 240 controls the actuation of the compressor 121, the valves 113 and 114, and the like based on the information from the dew-point meter 246 such that the upper-limit gas temperature Tt will fall below the withstand temperature γ (Tt<γ). However, the present invention is not limited to this case. An advantageous effect similar to the second embodiment can be achieved as long as the controller adjusts and controls at least one of the pressure of the natural gas to be achieved by the pressure adjuster, the temperature to which the natural gas is to be cooled by the natural-gas-liquid separator, and the temperature to which the natural gas is to be heated by the heater to a value which has been set in advance according to the composition of the natural gas from the ground, based on the information from the membrane-temperature detector and the gas-dew-point detector such that the natural-gas-liquid separator will liquefy and separate a part of the natural-gas liquid in the natural gas and the carbon-dioxide separator will maintain the remaining part of the natural-gas liquid in the natural gas in gaseous form.

In addition, in the above embodiments, a pressure reducing valve may be provided between the cooling unit 122 and the heating unit 123, for example. In this way, if by any chance a liquid film is about to be generated over the carbon-dioxide separation membranes 131a to 133a of the carbon-dioxide separation units 131 to 133 due to some reason, the pressure reducing valve may be opened to quickly lower the pressure and thereby instantaneously lower the dew point of the natural-gas liquid 3. Consequently, the generation of a liquid film is prevented.

Moreover, although the components such as the three carbon-dioxide separation units 131 to 133 constitute the carbon-dioxide separator in the above embodiments, the present invention is not limited to this case. One carbon-dioxide separation unit may constitute the carbon-dioxide separator or two or more carbon-dioxide separation units may constitute the carbon-dioxide separator.

INDUSTRIAL APPLICABILITY

The natural-gas purification apparatus according to the present invention can prevent wasteful energy consumption while always preventing the generation of a liquid film over the carbon-dioxide separation membranes of the carbon-dioxide separator, and is therefore highly industrially useful.

REFERENCE SIGNS LIST

1 NATURAL GAS
2 DRY GAS
3 NATURAL-GAS LIQUID
4 CARBON DIOXIDE
10 NATURAL-GAS SOURCE
100 NATURAL-GAS PURIFICATION APPARATUS
111 TO 114 VALVE
121 COMPRESSOR
122 COOLING UNIT
123 HEATING UNIT
131 FIRST CARBON-DIOXIDE SEPARATION UNIT
131a CARBON-DIOXIDE SEPARATION MEMBRANE
132 SECOND CARBON-DIOXIDE SEPARATION UNIT
132a CARBON-DIOXIDE SEPARATION MEMBRANE
133 THIRD CARBON-DIOXIDE SEPARATION UNIT
133a CARBON-DIOXIDE SEPARATION MEMBRANE
140 ARITHMETIC CONTROL DEVICE
140a INPUT UNIT
141 GAS-FLOW-RATE SENSOR
142 GAS-TEMPERATURE SENSOR
143 GAS-PRESSURE. SENSOR
200 NATURAL-GAS PURIFICATION APPARATUS
240 CONTROL DEVICE
240a INPUT UNIT
244 UPPER-LIMIT-TEMPERATURE SENSOR
245 LOWER-LIMIT-TEMPERATURE SENSOR
246 DEW-POINT METER

The invention claimed is:

1. A natural-gas purification apparatus for purifying natural gas from ground by separating carbon dioxide from the natural gas, comprising:
   a pressure adjuster that adjusts a pressure of the natural gas from the ground;
   a natural-gas-liquid separator that liquefies and separates a part of natural-gas liquid by cooling the natural gas after the pressure adjustment by the pressure adjuster;
   a heater that heats the natural gas after the separation of the part of the natural-gas liquid by the natural-gas-liquid separator;
   a carbon-dioxide separator that separates carbon dioxide from the natural gas heated by the heater through a carbon-dioxide separation membrane; and
   a controller that adjusts and controls at least one of a pressure of the natural gas to be achieved by the pressure adjuster, a temperature to which the natural gas is to be cooled by the natural-gas-liquid separator, and a temperature to which the natural gas is to be heated by the heater to a value which has been set in advance according to composition of the natural gas from the ground, such that the natural-gas-liquid separator liquefies and separates the part of the natural-gas liquid in the natural gas and the carbon-dioxide separator maintains a remaining part of the natural-gas liquid in the natural gas in gaseous form.

2. The natural-gas purification apparatus according to claim 1, further comprising:

a gas-flow-rate detector that detects a flow rate of the natural gas before the pressure adjustment by the pressure adjuster;

a gas-pressure detector that detects the pressure of the natural gas before the pressure adjustment by the pressure adjuster; and a gas-temperature detector that detects a temperature of the natural gas before the pressure adjustment by the pressure adjuster, wherein the controller adjusts and controls at least one of the pressure of the natural gas to be achieved by the pressure adjuster, the temperature to which the natural gas is to be cooled by the natural-gas-liquid separator, and the temperature to which the natural is to be heated by the heater to the value which has been set in advance according to the composition of the natural gas from the ground, based on information from the gas-flow-rate detector, the gas-pressure detector, and the gas-temperature detector such that the natural-gas-liquid separator liquefies and separates the part of the natural-gas liquid in the natural gas and the carbon-dioxide separator maintains the remaining part of the natural-gas liquid in the natural gas in gaseous form.

3. The natural-gas purification apparatus according to claim 1, further comprising:

a membrane-temperature detector that detects a temperature of the carbon-dioxide separation membrane of the carbon-dioxide separator; and a gas-dew-point detector that detects a dew point of the natural gas after the carbon-dioxide separation by the carbon-dioxide separator, wherein the controller adjusts and controls at least one of the pressure of the natural gas to be achieved by the pressure adjuster, the temperature to which the natural gas is to be cooled by the natural-gas-liquid separator, and the temperature to which the natural gas is to be heated by the heater to the value which has been set in advance according to the composition of the natural gas from the ground, based on information from the membrane-temperature detector and the gas-dew-point detector such that the natural-gas-liquid separator liquefies and separates the part of the natural-gas liquid in the natural gas and the carbon-dioxide separator maintains the remaining part of the natural-gas liquid in the natural gas in gaseous form.

4. The natural-gas purification apparatus according to claim 3, wherein the membrane-temperature detector includes an upper-limit-membrane-temperature detector that detects a temperature of the carbon-dioxide separation membrane of the carbon-dioxide separator at an upstream portion in a direction of natural-gas flow, and a lower-limit-membrane-temperature detector that detects a temperature of the carbon-dioxide separation membrane of the carbon-dioxide separator at a downstream portion in the direction of the natural-gas flow, and the controller calculates a lower-limit gas temperature Tb and an upper-limit gas temperature Tt based on the dew point Td detected by the gas-dew-point detector; and controls actuation of the heater based on information from the upper-limit-membrane-temperature detector and the lower-limit-membrane-temperature detector such that an upstream membrane temperature T1 detected by the upper-limit-membrane-temperature detector is lower than or equal to the upper-limit gas temperature Tt (T1≤Tt) and a downstream membrane temperature T2 detected by the lower-limit-membrane-temperature detector is higher than or equal the lower-limit gas temperature Tb (T2≥Tb).

5. The natural-gas purification apparatus according to claim 4, wherein if the calculated upper-limit gas temperature Tt is higher than or equal to a withstand temperature γ of the carbon-dioxide separation membrane of the carbon-dioxide separator (Tt≥γ), the controller controls actuation of the natural-gas-liquid separator based on information from the gas-dew-point detector such that the upper-limit gas temperature Tt falls below the withstand temperature γ (Tt<γ).

6. The natural-gas purification apparatus according to claim 5, wherein if the natural-gas-liquid separator reaches a maximum cooling temperature but the upper-limit gas temperature Tt is still higher than or equal to the withstand temperature γ (Tt≥γ), the controller controls actuation of the pressure adjuster based on the information from the gas-dew point detector such that the upper limit gas temperature Tt fall below the withstand temperature γ (Tt<γ).

7. The natural-gas purification apparatus according to claim 4, wherein the lower-limit-membrane-temperature detector detects a temperature of a surface on a natural-gas flow side of the carbon-dioxide separation membrane of the carbon-dioxide separator at a downstream portion in the direction of the gas flow, and the controller figures out the downstream membrane temperature T2 based on a natural-gas-flow downstream membrane temperature T2a detected by the lower-limit-membrane-temperature detector.

8. The natural-gas purification apparatus according to claim 4, wherein the lower-limit-membrane-temperature detector detects a temperature of a surface on a carbon-dioxide flow side of the carbon-dioxide separation membrane of the carbon-dioxide separator at a downstream portion in the direction of the gas flow, and the controller figures out the downstream membrane temperature T2 based on a carbon-dioxide-flow downstream membrane temperature T2b detected by the lower-limit-membrane-temperature detector.

9. The natural-gas purification apparatus according to claim 4, wherein the lower-limit-membrane-temperature detector includes a downstream-natural-gas-temperature detector that detects a temperature of the gas on a natural-gas flow side of the carbon-dioxide separation membrane of the carbon-dioxide separator at a downstream portion in the direction of the gas flow, and a downstream-carbon-dioxide-temperature detector that detects a temperature of the carbon dioxide on a carbon-dioxide flow side of the carbon-dioxide separation membrane of the carbon-dioxide separator at the downstream portion in the direction of the gas flow, and the controller figures out the downstream membrane temperature T2 based on a downstream natural-gas temperature T2c detected by the downstream-natural-gas-temperature detector and a downstream carbon-dioxide temperature T2d detected by the downstream-carbon-dioxide-temperature detector.

* * * * *